(12) United States Patent
Onishi et al.

(10) Patent No.: US 6,705,590 B2
(45) Date of Patent: Mar. 16, 2004

(54) FUEL SUPPLY APPARATUS

(75) Inventors: Yoshihiko Onishi, Tokyo (JP); Sigenobu Tochiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 162 days.

(21) Appl. No.: 10/117,225

(22) Filed: Apr. 8, 2002

(65) Prior Publication Data

US 2003/0062496 A1 Apr. 3, 2003

(30) Foreign Application Priority Data

Oct. 2, 2001 (JP) ................................. P2001-306830

(51) Int. Cl.$^7$ ............................................. F16K 31/02
(52) U.S. Cl. ............................. 251/129.15; 29/890.131
(58) Field of Search ....................... 137/15.18, 315.03; 251/129.15; 29/890.129, 890.131; 228/170, 171

(56) References Cited

U.S. PATENT DOCUMENTS 4,260,134 A * 4/1981 Ripert ........................ 251/367
5,178,362 A * 1/1993 Vogt et al. ............. 251/129.21

FOREIGN PATENT DOCUMENTS

JP 2000-145567 5/2000

* cited by examiner

*Primary Examiner*—Edward K. Look
*Assistant Examiner*—John K. Fristoe, Jr.
(74) *Attorney, Agent, or Firm*—Sughrue Mion, PLLC (57) ABSTRACT

The present invention provides a fuel supply apparatus which has solved the problem occurring after the welding of a connecting ring, by which a core of an electromagnetic valve and a housing are connected together, finishes of the deformation of the connecting ring and a crack in a welded portion. In this apparatus, the core of the electromagnetic valve and housing are welded together at a welded portion via the connecting ring having an L-shaped cross-sectional shape. A groove for at least reducing the degree of the deformation, which occurs after the welding thereof is done, of the connecting ring, preferably a groove having a projecting open surface is formed on the portion of the surface of the housing which is in the vicinity of the welded portion.

6 Claims, 8 Drawing Sheets

FUEL SUPPLY APPARATUS

BACKGROUND OF THE INVENTION

1. Field of the Invention

This invention relates to a fuel supply apparatus, and more particularly to a fuel supply apparatus for supplying a fuel under a high pressure to a fuel injection type internal combustion engine, for example, an automobile engine.

2. Description of the Related Art

Figure 7:
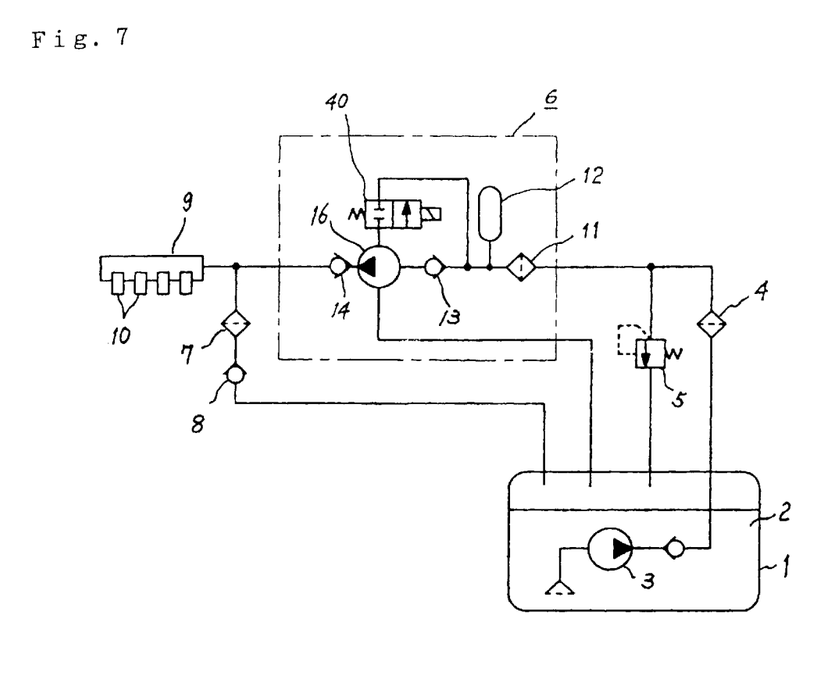
FIG. 7 illustrates a related art fuel supply system.
Figure 8:
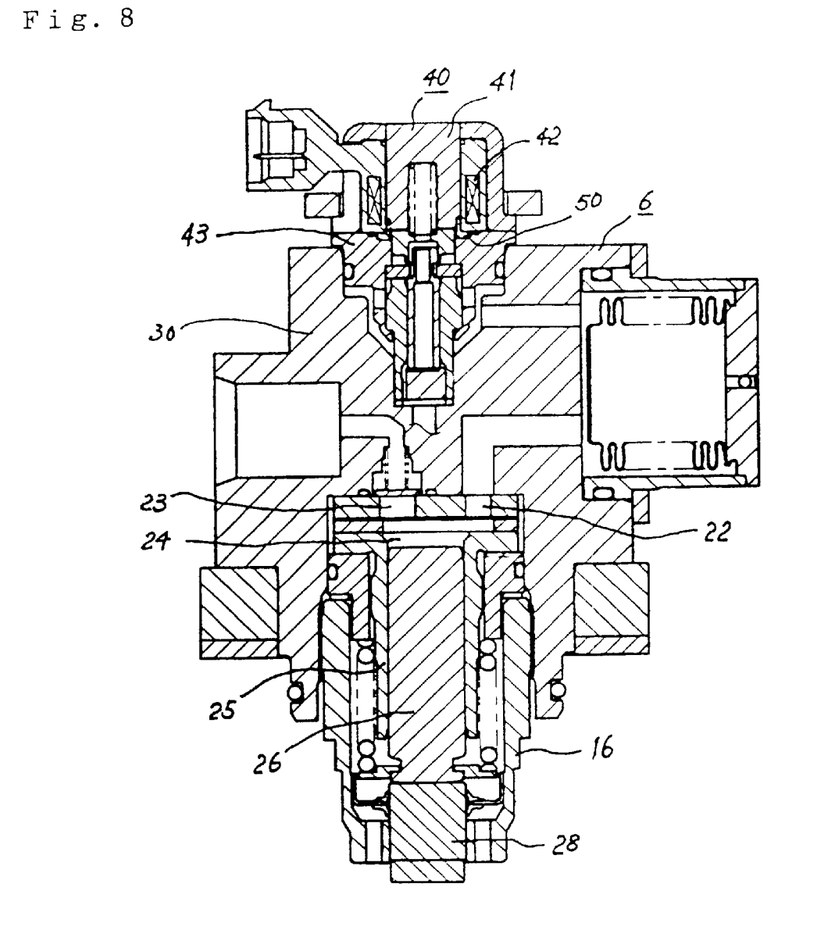
FIG. 8 is a sectional view of a principal portion of a related art fuel supply apparatus.
Figure 9:
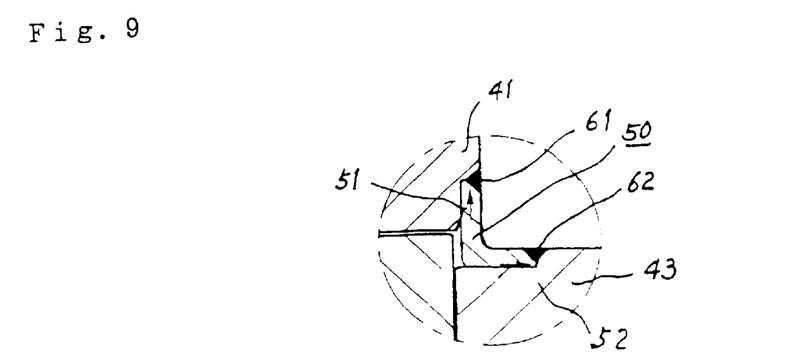
FIG. 9 is an enlarged sectional view of a part of FIG.

FIGS. 7–9 are drawings for describing a general fuel supply system for a fuel injection type internal combustion engine. FIG. 7 schematically illustrates this fuel supply system. FIG. 8 is a sectional view of a principal portion of a fuel supply apparatus included in the same fuel supply system, and FIG. 9 an enlarged sectional view of a part of what is shown in FIG. 8. Referring to FIGS. 7–9, the fuel supply system has as main elements a fuel tank 1, a fuel supply apparatus 6 and fuel injection valves 10, the fuel supply apparatus 6 having a filter 11, a low-pressure damper 12, a suction valve 13, a pump 16, a discharge valve 14 and an electromagnetic valve 40.

A fuel 2 in the fuel tank 1 is sent out by a low-pressure pump 3, and pressure-regulated in a low-pressure regulator 5 via a filter 4, the resultant fuel being supplied to the fuel supply apparatus 6. The pressure of only such a quantity of the fuel 2 thus supplied to the apparatus that is necessary for fuel injection is increased to a high level by the same apparatus 6, and the resultant fuel is supplied to the interior of a common rail 9 of an internal combustion engine (not shown). The fuel is then injected in the form of a high-pressure mist from the fuel injection valves 10 into cylinders (not shown) of an internal combustion engine. A necessary quantity of the fuel during this injection operation is determined by a control unit (not shown), and controlled by the electromagnetic valve 40, an excessive fuel being relieved from the electromagnetic valve 40 to the portion of a fuel passage which is between the low-pressure damper 12 and suction valve 13. A reference numeral 7 in FIG. 7 denotes a filter, and 8 a high-pressure relief valve. When the interior of the common rail 9 comes to have an abnormal pressure, the high-pressure relief valve 8 is opened to prevent the common rail 9 and fuel injection valve 10 from being broken.

Referring to FIG. 8 showing a principal portion of the fuel supply apparatus 6, the pump 16 includes a cylinder 25 installed in a casing 30 and provided therein with a pressure chamber 24 having a fuel suction port 22 and a fuel discharge port 23, a plunger 26 adapted to be moved vertically in the interior of the cylinder 25 and thereby vary the volume of the pressure chamber 24, and tappet 28 joined to the plunger 26. A driving cam (not shown) provided coaxially with an engine cam shaft (not shown) is engaged with a pressure receiving surface at a lower end in the drawing of the tappet 28, and the tappet 28 and plunger 26 are moved vertically in accordance with a rotation of this driving cam to cause the volume of the pressure chamber 24 to be varied.

Referring to FIGS. 8–9, the electromagnetic valve 40 has a core 41 and an electromagnetic coil 42, and is fixed to a housing 43. The core 41 and housing 43 are welded together via a connecting ring 50 having an L-shaped cross section. Namely, the connecting ring 50 has a first portion 51 welded to the core 41, and a second portion 52 welded to the housing 43. In other words, the core 41 and first portion 51 are welded at a welded portion 61, and the housing 43 and second portion 52 at a welded portion 62 respectively. In FIG. 9, an illustration of the electromagnetic coil 42 is omitted so that such welded condition is understood easily.

In order to connect the core 41 and housing 43 together, the connecting ring 50 is press fitted therebetween first, and each abutting portion is welded over the whole circumference thereof by a regular method to form the welded portions 61, 62.

The welded portions 61, 62 contract while they cool down after the welding operation finishes, and the connecting ring 50 of a low strength is deformed so as to be drawn to the core 41 and housing 43 as shown by arrows in FIG. 9, i.e., in such a manner that the first and second portions 51, 52 thereof are drawn toward the core 41 and housing 43 respectively. The degree of this deformation is not uniform from a welding starting position toward a welding finishing position in the circumferential direction of the connecting ring 50. As a result, an abominable problem arises, i.e., the core 41 inclines with respect to the axis thereof to cause the performance of the electromagnetic valve 40 to become unstable.

In the welded portions 61, 62, especially, in the welded portion 62, stress including a large tensile component resides on the surface thereof due to the above-mentioned contraction thereof, and this residual stress causes a crack to occur in the welded portion 62. The connecting ring 50 in use is formed in many cases of a nonmagnetic steel material, for example, stainless steel of austenite. Since the linear expansion coefficient of this material is larger than those of other metal materials, the problems mentioned above stand out more. Furthermore, when a pressure is applied to the interior of a fuel passage of the electromagnetic valve 40, a clearance occurs between contact surfaces of the connecting ring 50 and housing 43, especially, in the radial direction due to the deformation mentioned above of the connecting ring 50. The above-mentioned pressure works in such a clearance, and a pressure receiving area gradually increases, the degree of deformation of the connecting ring also increasing. Therefore, there is the possibility that fatigue failure occurs in the above-mentioned deformed portions during an operation of the electromagnetic valve 40 to give rise to the leakage of the fuel.

SUMMARY OF THE INVENTION

The present invention has been made in view of the above-mentioned circumstances, and provides a fuel supply apparatus which has solved the problem occurring after the welding of a connecting ring, by which a core of an electromagnetic valve and a housing are connected together, finishes of the deformation of the connecting ring and a crack in a welded portion.

According to an aspect of the present invention, the fuel supply apparatus has a core of an electromagnetic valve and a housing which are welded together via a connecting ring having an L-shaped cross section, the housing being provided in the portion thereof which is in the vicinity of the part of the housing on which the housing is welded to the connecting ring therefor with a groove for at least reducing the degree of deformation of the connecting ring occurring after the welding operation finishes.

According to another aspect of the present invention, the fuel supply apparatus is in accordance with the above invention, in which the connecting ring has a first portion welded to the core, and a second portion welded to the housing, the thickness of the second portion being larger than that of the first portion.

According to still another aspect of the present invention, the fuel supply apparatus is in accordance with the second-mentioned invention, in which the thickness of the second portion is larger than the depth of a cut made in a corner of the housing and adapted to have the second portion fitted therein.

According to a further aspect of the present invention, the fuel supply apparatus is in accordance with the first-mentioned invention, in which an open surface of the welded portion of the housing and connecting ring project in a swollen state.

According to another aspect of the present invention, the fuel supply apparatus is in accordance with any one of the first to fourth inventions, in which the groove is cross-sectionally so shaped that the distance between both of opposite side walls thereof decreases gradually toward a bottom thereof.

According to still another aspect of the present invention, the fuel supply apparatus is in accordance with the fifth-mentioned invention, in which the side surface of the groove which is on the side of the connecting ring has an angle of inclination of 40–60 degrees.

BRIEF DESCRIPTION OF THE DRAWINGS

Preferred embodiments of the present invention will be described in detail with reference to the following figures, wherein.

DESCRIPTION OF THE PREFERRED EMBODIMENTS:

In the following description, the parts identical with those shown in FIGS. 7–9 illustrating related art fuel supply system and apparatus will be designated by the same reference numerals, and the description thereof will be omitted in some cases.

Mode 1 of Embodiment

Figure 1:
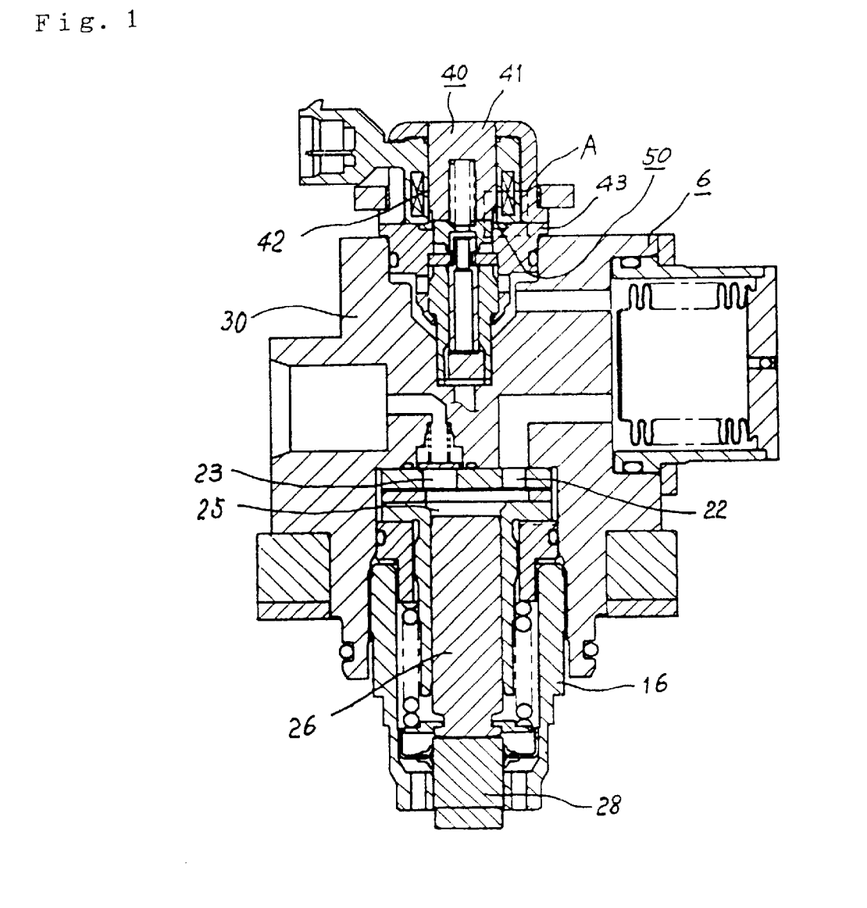
FIG. 1 is a sectional view of a principal portion of a mode 1 of embodiment of the fuel supply apparatus according to the present invention.
Figure 2:
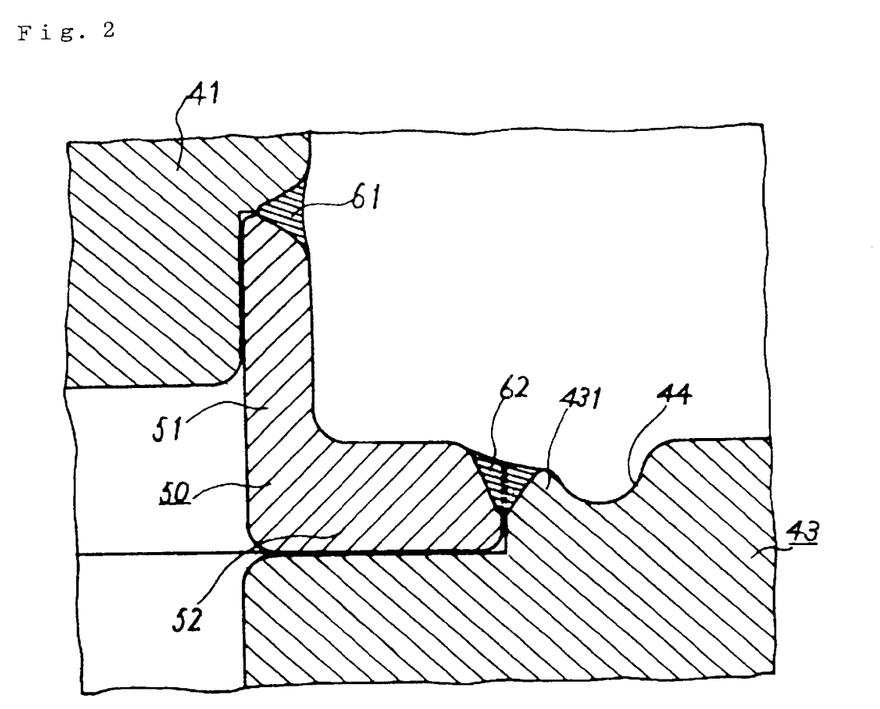
FIG. 2 is an enlarged sectional view of a portion A of FIG. 1.
Figure 3:
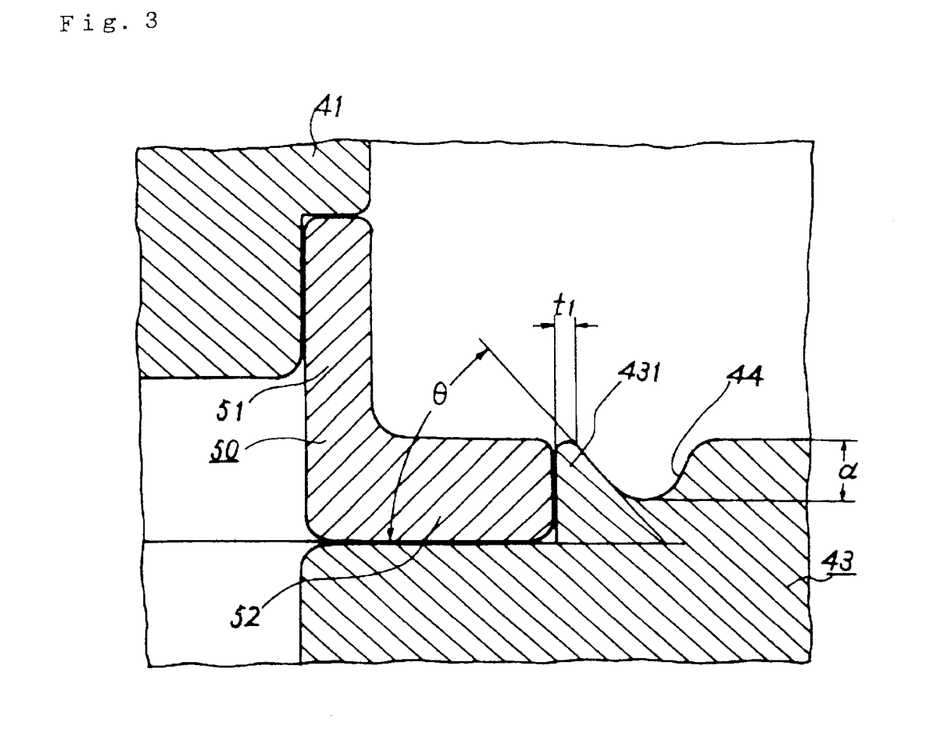
FIG. 3 is a sectional view showing the condition of the parts not yet welded together of FIG. 2.

FIGS. 1–3 illustrate a mode 1 of embodiment of a high-pressure fuel supply apparatus as an example of the fuel supply apparatus according to the present invention, in which FIG. 1 is a sectional view of a principal portion of the mode 1 of embodiment; FIG. 2 an enlarged sectional view of a portion A of FIG. 1; and FIG. 3 a sectional view of the condition of the parts not yet welded together of FIG. 2. In FIGS. 2 and 3 and FIGS. 4–6 which will be referred to later, an illustration of an electromagnetic coil 42 shown in FIG. 1 is omitted for the reason identical with that why a similar illustration is omitted in FIG. 9.

Referring to FIGS. 2–3, a reference numeral 44 denotes an annular groove formed in the portion of a surface of a housing 43 which is in the vicinity of a welded portion 62 thereof with respect to a connecting ring 50. Referring to FIG. 3, a reference symbol t1 denotes a distance between an end surface of a second portion 52 of the connecting ring 50 not yet welded and an edge of the groove 44, a reference letter d the depth of the groove 44, and a reference letter θ an angle of inclination of an inclined surface of the groove 44.

Due to the provision of the groove 44, a thin-walled portion 431 occurs between the groove 44 and the end surface of the housing 43. Since the thin-walled portion 431 has a small thickness, it has a low rigidity and a certain degree of flexibility. Therefore, when the welded portion 62 thermally contracts after the welding operation finishes, the thin-walled portion 431 is deformed slightly following the thermal contraction of the welded portion so that the thin-walled portion is inclined toward the connecting ring 50. Owing to this deformation of the thin-walled portion 431, such problems including the deformation of the connecting ring 50 and a crack in the welded portion 62 that are encountered in a related art apparatus of this kind are reduced or solved.

The degree of the flexibility of the thin-walled portion 431 depends upon the height thereof, i.e. the depth d of the groove 44 and an average thickness of the thin-walled portion. This average thickness depends upon the above-mentioned distance t1 and angle θ of inclination, and increases in proportion to the distance t1 and in inverse proportion to the angle θ of inclination. Thus, when the height of the thin-walled portion 431 is set smaller, and, when the average thickness thereof is set larger, the flexibility thereof becomes lower, and the effect of preventing the deformation of the connecting ring 50 becomes poorer. Conversely, when the height of the thin-walled portion 431 is set larger, and, when the average thickness thereof is set smaller, the flexibility thereof becomes higher, and the effect of preventing the deformation of the connecting ring becomes greater. However, when this flexibility becomes excessively high, the thin-walled portion is broken in some cases due to the fatigue failure thereof occurring during the manufacturing of the apparatus.

Therefore, it is preferable that the thin-walled portion 431 has proper height and average thickness. In other words, it is preferable that the levels of t1, d and θ are at suitable levels. To be concrete, the levels of t1, d and θ should be, for example, around 0.15–0.3 mm, around 0.8–1.2 mm and around 40–60 degrees respectively when a case where a connecting ring having a first portion 51 of around 11–12 mm in outer diameter is used as the connecting ring 50 is taken as an example. Both of the first and second portions 51, 52 of the connecting ring 50 receive the force shown in FIG. 9 when the welded portions 61, 62 thermally contract, and the force exerted on the second portion 52 is generally larger than that exerted on the first portion 51. Therefore, the second portion 52 is more liable to be deformed. Inconsequence, it is preferable in the present invention that the second portion 52 be formed thicker than the first portion 51 for the purpose of preventing the deformation thereof. To be concrete, when the thickness of the first portion 51 is around 0.5–0.8 mm, the thickness of the second portion 52 is set to around 0.8–1.2 mm. The diameter the open surfaces of the welded portions 61, 62 and the depth of these portions may be set equal to those employed in the related art apparatus of this kind, and, when the above-mentioned sizes of parts are employed, these diameter and depth are set to around 0.7–0.8 mm and around 0.4–0.7 mm.

Mode 2 of Embodiment

Figure 4:
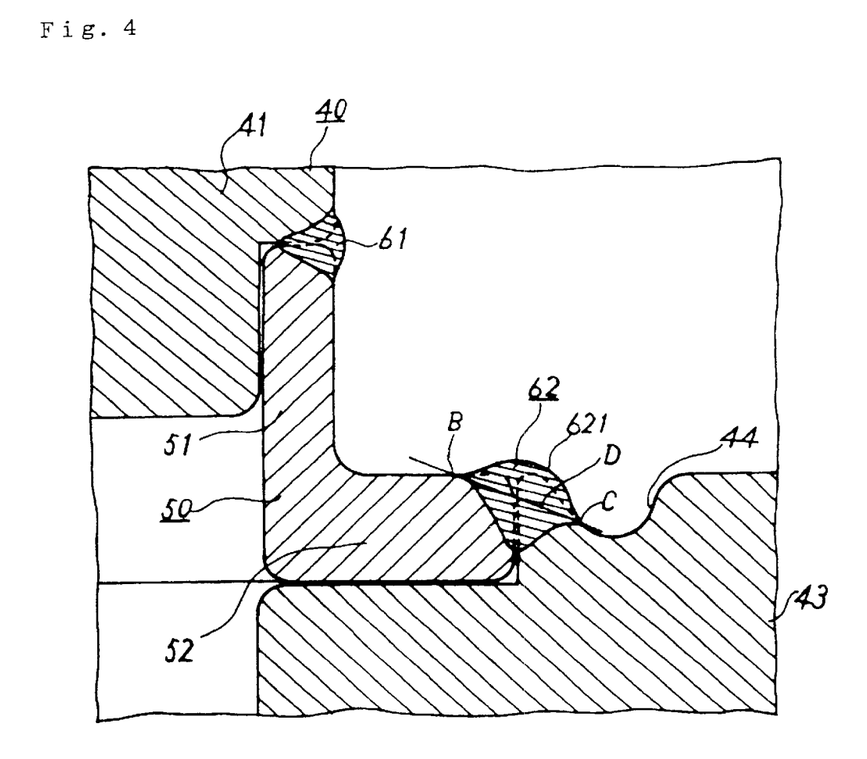
FIG. 4 is an enlarged sectional view of such a portion A as mentioned above of a mode 2 of embodiment of the fuel supply apparatus according to the present invention.

FIG. 4 illustrates a mode 2 of embodiment of a high-pressure fuel supply apparatus as an example of the fuel supply apparatus according to the present invention, and is an enlarged sectional view of a mode of embodiment different from the mode 1 of embodiment concerning such a portion A thereof as is shown in FIG. 1. Namely, an open surface 621 of a welded portion 62 in the mode 2 of embodiment is swollen in an outwardly projecting state. On the other hand, the corresponding portion in the mode 1 of embodiment is sunken in a recessed state. Thus, the mode 2 of embodiment is different from the mode 1 of embodiment in the shape of the open surface 621. Referring to FIG. 4, the dotted lines in welded portions 61, 62 show the condition of the surfaces of a housing 43 and a second portion 52 of a connecting ring 50 which are not yet welded together, and the condition of these parts is identical with that of the corresponding parts shown in FIG. 3.

When the open surface 621 of the welded portion 62 is swollen in a projecting state, the problem of occurrence of a crack in the welded portion 62 which is ascribed to the thermal contraction thereof occurring after the welding operation has finished is prevented more reliably. This crack preventing effect is based on the residual stress working as will be described as follows in addition to the effect of a flexible thin-walled portion 431 described under Mode 1 of Embodiment. Namely, when the open surface 621 is recessed, the residual stress on a central portion thereof works so as to draw (i.e. residual stress including the tensile stress as a main component) the housing 43 and connecting ring 50, so that a crack becomes liable to occur. On the other hand, when the open surface 621 has a projecting shape, the residual stress works so as to compress (i.e. residual stress including compressive stress as a main component) the housing and connecting ring toward the center of the welded portion, so that a crack becomes hard to occur.

According to the present invention, the projecting shape of the open surface 621 means that the open surface has a mountain-shaped portion exceeding a segment D connecting the hem points B, C of the welded portion 62 in FIG. 4. There is not a special limit to the height of the mountain-shaped portion exceeding the segment D. However, when the diameter and depth of the open surface 621 of the welded portion 62 are at the above-mentioned levels (around 0.7–0.8 mm and around 0.4–0.7 mm respectively), the height of the mountain-shaped portion is set suitably to, for example, around 0.01–0.3 mm.

Mode 3 of Embodiment

Figure 5:
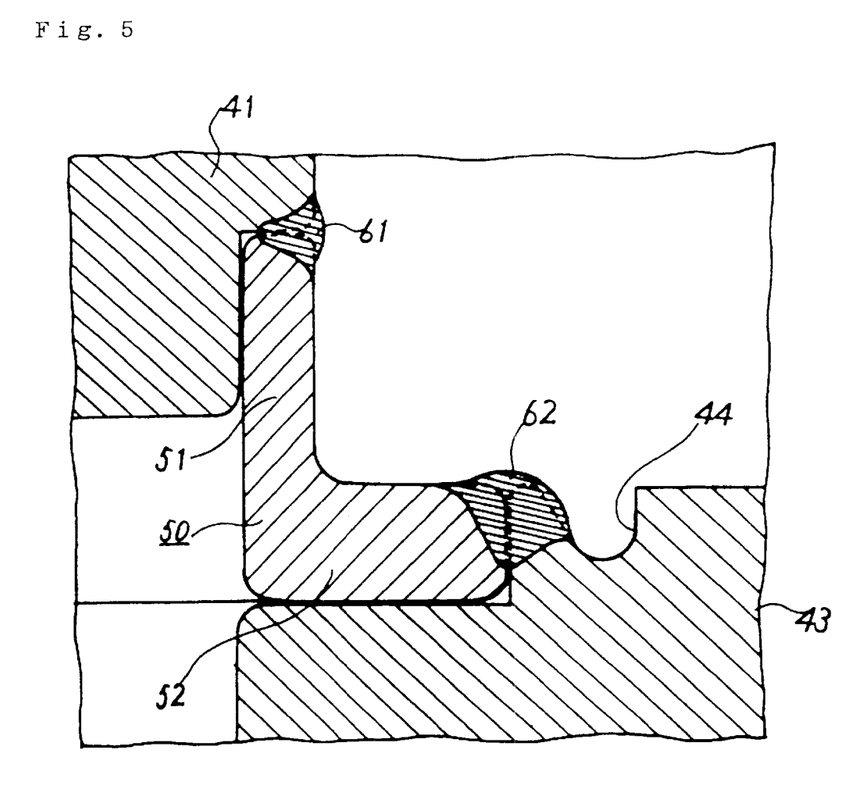
FIG. 5 is an enlarged sectional view of such a portion A as mentioned above of a mode 3 of embodiment of the fuel supply apparatus according to the present invention.

FIG. 5 illustrates a mode 3 of embodiment of a high-pressure fuel supply apparatus as an example of the fuel supply apparatus according to the present invention, and is an enlarged sectional view of a mode of embodiment different from the modes 1 and 2 of embodiment concerning such a portion A thereof as is shown in FIG. 1. The cross-sectional shape presented before the welding operation is carried out of a groove 44 in the mode 3 of embodiment in comparison with that employed in the mode 2 of embodiment of the corresponding groove shows that the side surface of the groove which is on the side of the connecting ring 50 is an inclined surface just as the corresponding surface in the mode 2 of embodiment, and that the opposite side surface thereof is a vertical surface or a surface similar thereto as is clear from a portion shown by a dotted line in a welded portion 62 of FIG. 5 and a portion continuing therefrom and shown by a solid line outside of the welded portion 62. Although the mode 3 of embodiment differs from the above-mentioned mode 2 of embodiment in this point, the construction of the other portions of the former is identical with that of the corresponding portions of the latter. The effects of these modes of embodiment are also identical.

According to the present invention, the cross-sectional shape of the groove 44 formed in the housing 43 is not specially limited as long as the groove displays the operation described under Mode 1 of Embodiment. The groove may have a V-shaped or U-shaped cross-sectional shape employed in the modes 1 and 2, a V-and-U-shape mixed type cross section employed in the mode 3 of embodiment, or other cross-sectional shapes. However, it is preferable that a groove of a V-shaped cross section and a groove of a V-and-U-shape mixed type of cross section in which the distance between opposite side wall surfaces of the groove decreases gradually toward the bottom thereof be provided. Above all, a groove in which the side surface on the side of the connecting ring 50 is inclined, and a groove in which the same side surface as mentioned above is inclined and has an angle $\theta$ (refer to FIG. 3) of inclination of around 40–60 degrees are specially preferable. This inclined surface may be a flat surface or a curved surface. When the inclined surface is a curved surface, the angle $\theta$ may have a value of a corresponding angle of an approximated flat surface. When the welded portion 62 provided with such an inclined surface is formed in the present invention so that at least one point on a cross section of the inclined surface constitutes the point C in FIG. 4, the open surface 621 of the welded portion 62 can be easily formed to a projecting shape.

Mode 4 of Embodiment

Figure 6:
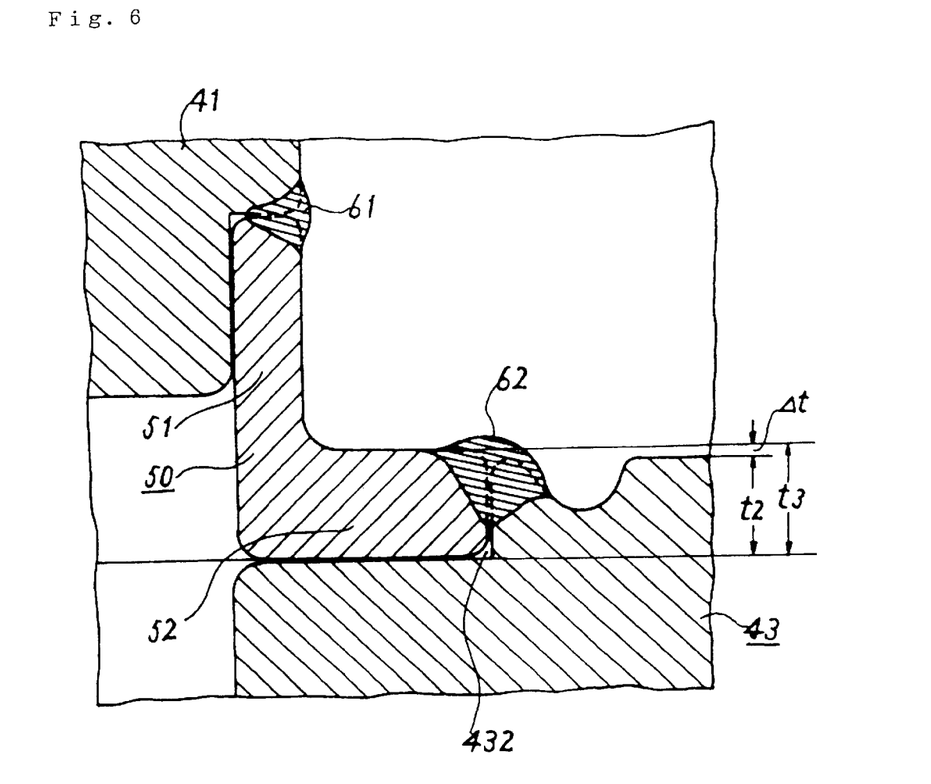
FIG. 6 is an enlarged sectional view of such a portion A as mentioned above of a mode 4 of embodiment of the fuel supply apparatus according to the present invention.

FIG. 6 illustrates a mode 4 of embodiment of a high-pressure fuel supply apparatus as an example of the fuel supply apparatus according to the present invention, and is an enlarged sectional view of a mode of embodiment different from the modes 1–3 of embodiment concerning such a portion A thereof as is shown in FIG. 1. Referring to FIG. 6, a reference symbol t2 denotes a depth of a cut 432 formed in a corner of a housing 43 so as to fit a connecting ring 50 in the housing, t3 a thickness of a second portion 52 of the connecting ring 50, and $\Delta t$ a difference between t2 and t3. In the mode 4 of embodiment, a connecting ring 50 having $\Delta t$ of a positive value, in other words, a connecting ring 50 having a second portion 52 of a thickness t3 larger than the depth t2 of the cut is used.

The connecting ring 50 industrially produced has a scatter of sizes just as other industrial products. Even the thickness of the second portion 52 of the connecting ring 50 is not exceptional. Assuming that a connecting ring 50 in which the thickness t3 of a second portion 52 thereof is smaller than t2 is fitted in a cut 432 so that an upper surface of the second portion 52 becomes flush with the surface of a housing 43 in which a recess 44 is formed, a clearance occurs between a lower surface of the second portion 52 and an opposed surface of the cut 432. There is the possibility that the leakage of a fuel from this clearance occurs.

To deal with this problem, the thickness t3 of the second portion 52 of the connecting ring 50 in the mode 4 of embodiment is set larger than t2. Therefore, even when the connecting ring 50 is fitted in the housing so that the connecting ring 50 closely contacts the opposed surface of the cut 432, the connecting ring is put in the condition shown in FIG. 6, and the welding of the connecting ring 50 and housing 43 together can be done without trouble. The magnitude of $\Delta t$ shown in FIG. 6 is suitably around 0.1 mm–0.2 mm.

The present invention is not limited to the above-described modes 1–4 of embodiment. Under the Modes 1–4 of Embodiment, improved methods devised with attention paid to the welded portions 62 alone are described in detail. The problems of the present invention can be solved more effectively by adding improvements (provision of a groove in the core 41, and various other improvements concerning the welding operation), which are identical with those added to the welded portion 62, to the welded portion 61 as well.

When the fuel supply apparatus according to the first-mentioned invention is, as described above, a fuel supply apparatus having a core of an electromagnetic valve and a housing which are welded together via a connecting ring having an L-shaped cross section with the housing provided in the portion thereof which is in the vicinity of the part of the housing in which the housing is welded to the connecting ring therefor with a groove for at least reducing the degree of the deformation of the connecting ring occurring after the welding operation finishes, a thin-walled portion occurs between the groove and an end surface of the housing due to the provision of the groove, this thin-walled portion having a low rigidity and a certain degree of flexibility due to the small thickness thereof. Therefore, when the welded portion thermally contracts after the welding operation finishes, the thin-walled portion is deformed slightly following the thermal contraction of the welded portion so that the thin-walled portion is inclined toward the connecting ring. Owing to this deformation of the thin-walled portion, such problems including the deformation of the connecting ring and a crack in the welded portion 62 that are encountered in the related art apparatus of this kind can be reduced or solved.

In the first-mentioned invention, the connecting ring has a first portion welded to the core, and a second portion welded to the housing, and the second portion is thicker than the first portion. Both the first and second portions generally receive such force as is shown in FIG. 9 when the welded portion thermally contract, and the force which the second portion receives is generally larger than that which the first portion receives. Since the second portion which is therefore originally more liable to be deformed than the first portion is formed thicker than the first portion, the deformation of the second portion can be prevented.

When the thickness of the second portion in the second-mentioned invention is larger than the depth of the cut formed in a corner of the housing and adapted to have the second portion fitted therein, the opposed surfaces of the second portion of the connecting ring and cut are brought into close contact with each other. In consequence, the problem of the leakage of a fuel occurring when a clearance exists between the above-mentioned opposed surfaces is solved.

When the open surface of the welded portion of the housing and connecting ring in the first-mentioned invention projects in a swollen state, the problem of a crack ascribed to the thermal contraction of the welded portion occurring after the welding operation finishes is prevented more reliably.

When the groove in any one of the first- to fourth-mentioned inventions is cross-sectionally so formed that the distance between opposite wall surfaces of the groove decreases gradually toward the bottom thereof with, especially, the side wall on the side of the connecting ring having an angle of inclination of 40–60 degrees, the welded portion is formed so as to cover at least a part of the inclined side wall therewith. This easily enables the open surface of the welded portion to have a projecting shape.

What is claimed is:

1. A fuel supply apparatus comprising a core of an electromagnetic valve and a housing which are welded together via a connecting ring having an L-shaped cross section, a groove adapted to at least reduce the degree of deformation of the connecting ring occurring after the welding operation finishes, and formed in the portion of the housing which is in the vicinity of the part thereof on which the housing is welded to the connecting ring.

2. A fuel supply apparatus according to claim 1, wherein the connecting ring has a first portion welded to the core, and a second portion welded to the housing, the second portion being formed to a thickness larger than that of the first portion.

3. A fuel supply apparatus according to claim 2, wherein the thickness of the second portion is larger than the depth of a cut made in a corner of the housing and adapted to have the second portion fitted therein.

4. A fuel supply apparatus according to claim 1, wherein open surfaces of the welded portions of the housing and connecting ring project outward in a swollen state.

5. A fuel supply apparatus according to claim 1, wherein the groove is cross-sectionally so shaped that the distance between both of opposite side walls thereof decreases gradually toward a bottom thereof.

6. A fuel supply apparatus according to claim 5, wherein the side wall of the groove which is on the side of the connecting ring has an angle of inclination of around 40–60 degrees.

* * * * *